US005715215A

United States Patent [19]

Haas et al.

[11] Patent Number: 5,715,215

[45] Date of Patent: Feb. 3, 1998

[54] CONVENTION BADGE

[75] Inventors: David J. Haas; Sandra F. Haas, both of Suffern, N.Y.

[73] Assignee: Temtec, Inc.

[21] Appl. No.: 955,469

[22] Filed: Oct. 2, 1992

Related U.S. Application Data

[63] Continuation-in-part of Ser. No. 602,120, Oct. 22, 1990, which is a continuation-in-part of Ser. No. 460,753, Jan. 4, 1990, Pat. No. 5,058,088.

[51] Int. Cl.$^6$ .......................... G04B 17/00; G01N 31/32

[52] U.S. Cl. .............................. 368/327; 116/200; 40/1.5

[58] Field of Search .............................. 368/327; 40/1.5; 116/200

[56] References Cited

U.S. PATENT DOCUMENTS

| | | | |
|---|---|---|---|
| 2,070,002 | 11/1937 | Cruver | 40/1.5 |
| 2,618,086 | 11/1952 | Komorvs | 40/1.5 |
| 3,175,317 | 3/1965 | Slavsky | 40/2 |
| 3,237,326 | 3/1966 | Naffin | 40/1.5 |
| 3,561,066 | 2/1971 | Osteen | 24/3 |
| 4,097,971 | 7/1978 | Morris | 24/253 |
| 4,155,183 | 5/1979 | Abrhams | 40/1.5 |
| 4,903,254 | 2/1990 | Haas | 368/327 |
| 4,961,275 | 10/1990 | Klein | 40/1.5 |
| 5,107,470 | 4/1992 | Pedicano et al. | 368/327 |

FOREIGN PATENT DOCUMENTS 2622795 8/1977 Germany .

*Primary Examiner*—Bernard Roskoski
*Attorney, Agent, or Firm*—Michael E. Zall

[57] ABSTRACT

An identification badge comprises a base coated with an adhesive protected by release paper. This badge is assembled by removing the release paper, placing an identification card into contact with the adhesive, and then attaching a fastener through a slot in the base of the badge. Various fasteners may be used to attach this badge to wearer's apparel. The badge can be assembled without damaging the identification card or the identification indicia, contained therein. The identification card can also be mounted so that the identification indicia is placed against a transparent, adhesive and viewed through a transparent base. In this embodiment, the information placed on the identification card cannot be altered without damaging the identification card. Also in this embodiment, a timing indicator can be incorporated into the badge so as to show the expiration of the badge after a selected period of time. The identification badge can be easily assembled at the site of use, and it can be cut to fit whatever identification indicia that is to be applied to it, such as business cards, photo-identification cards or the like.

5 Claims, 5 Drawing Sheets

CONVENTION BADGE

RELATED APPLICATIONS

This application is a continuation in part of U.S. application Ser. No. 07/602,120 filed Oct. 22, 1990, entitled PATTERNED INDICATORS which is a continuation in part application of U.S. application Ser. No. 07/460,753 filed Jan. 4, 1990, now U.S. Pat. No. 5,058,088, entitled "TIME INDICATOR". The entire disclosures of these applications are incorporated herein by reference.

BACKGROUND OF THE INVENTION

1. Field of the Invention

This invention relates to an identification badge. More particularly, the present invention relates to an identification badge which can be readily assembled and fastened to a user's clothing.

2. Description of the Prior Art

Many organizations have regular gatherings of large numbers of individuals such as at conventions or trade shows where products are sold or exhibited by member companies. Such conventions are important marketing tools for many firms. The attendance at these and other gatherings may total thousands of individuals and the sponsors of the convention as well as the participating firms are desirous of having detailed information regarding the attendees. Thus, identification badges may often be required to include the attendee's name, a company name and address, and other information which can be easily read visually and/or information that may be easily scanned or read by computer operated devices.

Heretofore, forms have been printed with this information and assembled into an identification badge which is worn by attendees. In addition, plastic cards have been produced which bear this information and which may be attached to a fastening means and either worn or carried by the attendee. The information on these identification badges varies with the type of gathering. In all cases, the importance of a visual identification of the attendees by convention officials, by the organizers, or by other attendees can be extremely important.

One of the most common badges used in the past is a card having a name or other identifying insignia placed on it. This card may be pre-printed, may be hand written or typed and is often enclosed in a transparent plastic cover or carried in a transparent holder or a holder with a transparent face. These holders typically have a pin attached or adapted to be attached to the identification holder and then to the clothing of the wearer.

At conventions, hundreds or even thousands of identification cards must be assembled quickly and accurately. The traditional method of preparing a printed card, manually inserting this card into a plastic envelope and then attaching a pin type holder or other type of fastening means is time consuming and costly. The frequent insertion and withdrawal of a pin as a fastening means may detrimentally affect the fabric of the user's clothing and its operation is troublesome and hazardous in terms of pricking of the user's finger each time he or she inserts or removes the identification badge.

Numerous attempts have been made by those skilled in the art to overcome the foregoing limitations. Typical prior art efforts to attain this end are as follows:

U.S. Pat. No. 2,070,002 to Cruver discloses an identification badge comprising a bowed sheet of metal formed with two parallel edges at the top and bottom of the front surface so as to accept a clear plastic layer. An identification card with appropriate information is inserted between this transparent layer and the metal badge holder so that the identification card can be seen through the clear plastic layer. A safety pin type fastener is soldered or attached to the back of this metal identification badge so that the badge can be attached to clothing.

U.S. Pat. No. 2,618,086 to Komorous discloses an identification badge comprising a single sheet of transparent plastic material which is folded so that the back wall faces the front wall and a portion of the front wall at the bottom of the badge is folded up and rearwardly to provide a receiving groove into which the lower edge of the back wall is inserted to form an envelope. Two rectangular slots are punched into the upper center portion of the back wall to receive a U-shaped fastening clip. An appropriately labeled name plate or name tag can be inserted either through the open sides of this assembly or inserted before the back wall is inserted into the bottom groove of the front section. The badge is fastened to an individual's clothing by slipping the U-shaped fastening clip over the free edge of some article of clothing. This badge requires assembly of a U-shaped fastening clip through small plastic slots, the insertion of an identification card and the assembly of the back wall of the badge into the groove of the front section in order to close the badge. This badge is susceptible to the identification card sliding and falling out of the badge holder as the wearer moves around.

U.S. Pat. No. 3,175,317 to Slavsky, discloses an identification badge formed of a single sheet of folded plastic material with a front flap and a rear flap. The rear flap is provided with a number of alternate fastening means for attaching the badge in different ways to a wearer's clothing. The identification badge is formed of a single sheet of flat, smooth stiff, plastic material. This sheet is folded around a horizontal fold line to form a front flap and a rear flap. Indicia, such as the name of the wearer, may be written directly upon the front of the badge using a crayon or ink marking pen. In an alternative embodiment, a channel may be adhesively secured to the front of the badge and a card or strip with printed identification information may be removably inserted into this channel.

U.S. Pat. No. 3,237,326 to Naffin, discloses a badge holder comprising a flat sheet to which identification information is attached and a clip which is pivotally mounted to the back of the badge and is adapted to be detachable attached to an article of clothing. The front of the badge may bear any desired indicia to identify the person or to provide other information regarding the person or the organization. The clip may be permanently attached to the badge or it may be detachable. This disclosure is directed mainly to a clip for attaching a badge holder to an article of clothing, this clip being either permanently or removably attached to the identification portion of the badge.

U.S. Pat. No. 4,097,971 to Morris, discloses a clip-on badge which is formed from a single piece of a light weight material such as aluminum. The display surface can be pre-printed or marked upon using an appropriate crayon or other marking pen. In addition, a retaining lip may be incorporated into this badge so that an identification card can be inserted and held in place by this retaining lip.

U.S. Pat. No. 4,155,183 to Abrahams, discloses a pin and clip fastener used to attach a transparent plastic identification holder to a wearer's clothing. The fastener is attached to the rear of the transparent plastic holder and an identification card is inserted between the front and rear walls so as to be visible through the front wall. The fastener incorporates both a pin and a pin arm. The pin can be pushed through a portion of a garment and then the pin arm engaged to a hook in the manner of a safety pin mechanism. If inserting a pin through an article of clothing is undesirable, then the identification badge can be slipped inwardly over an edge portion of a garment, which may be a pocket or other margin, and held therein by arms extending downward and parallel to the back of the identification badge.

U.S. Pat. No. 4,903,254 to Haas, discloses a timing indicator used as part of a security badge. The badge is made of two parts, a front part being the face of the badge and the back part having stripes printed with a special ink that migrates through to the front portion. When the badge is issued, the self adhesive front portion is placed over the back part and the timing process begins. The ink passes or migrates through the badge to the front portion in a predetermined time period whereupon the printed stripes become visible, so indicating that the badge is no longer valid.

U.S. Pat. No. 4,961,275 to Klein, discloses a hook and loop fabric badge containing identification indicia which can be worn by hospital personnel in a delivery room without posing a danger of scratching infants. The badge is comprised of a rectangular piece of the loop fabric which is attached via a rigid support member positioned over the loop fabric and with posts which extend through the loop fabric layer, through the fabric of the garment to be attached, and which are then terminated with fastening devices so as to hold the loop fabric layer to the garment. A hook fabric layer with identification indicia on the face is then brought into contact with the loop fabric layer so as to form the identification badge. When the surface containing the hooks is placed in face to face contact with the surface containing the loops, the hooks and loops engage and form a connection which is resistant to separation, except by peeling the hook fabric layer off.

U.S. Pat. No. 5,058,088 to Haas, discloses a timing indicator type badge, label or display wherein the relative amount of time that has elapsed from the initial activation of the timing indicator can be easily determined by the progression of a visually perceptible change in color along different areas of the timing indicator. This timing indicator comprises a clear self-adhesive film which is placed over a printed substrate in order to activate the timing indicator. The printed substrate includes a migrating or soluble ink which migrates through the adhesive layer until the indicia is visible at the surface of the clear film. The rate of dissolution of the migrating ink by the adhesive on the cover film determines whether the time interval is a few hours, a day, a week, etc. For each time interval, the relative darkening of indicator bands on the printed face of the badge or label shows the relative lapsed time since the badge was issued or activated.

German Patent No. 26 22 795 to Gunther, discloses a means of fastening an attaching clip to the back of an identification badge or identification card. The clip comprises an attaching means, a support plate, and an adhesive coating on one side of the support plate and the attaching clamp on the other side. A protective foil covers the adhesive layer. To attach the clip to the back of the identification card, this protective foil is removed and the adhesive layer is brought into contact with the back of the card thereby enabling the identification card to be attached to an individual's garment.

The present invention overcomes many of the drawbacks and deficiencies of the convention badges of the prior art and provides a unique, inexpensive, and easy to apply solution to preparing an identification badge.

SUMMARY OF THE INVENTION

The present invention is directed to an easily assembled convention badge, visitor's badge or identification badge which can be pre-printed, machine printed, hand printed or hand written, or prepared by some other means upon a paper, card stock, or plastic identification media. This identification media is then readily adhered to the adhesive side of the badge holder of the invention in a simple and economical operation. A timing indicator or timing spot may be inserted between the identification media and the adhesive side of the badge holder so as to invalidate the badge after a preselected time interval. The resulting assembly provides a visually readable identification badge with the desired information readily apparent. This invention also provides a means for attaching a fastener to the identification badge which attaches the badge to an article of clothing.

The identification badge of the present invention can be assembled at the location where the badge will be used, such as at a convention or a tradeshow. The badge comprises a base having an adhesive layer and identification media. The identification media is adhesively attached to the base by the adhesive layer. A fastening means is used to attach the identification badge to the user's clothing. The base can be adapted to be used with many alternative types of fastening means, such as clip-on fasteners, spring type fasteners, friction fasteners, safety pin fasteners, fasteners incorporating slide-on retaining bars, and the like. In addition, a timing indicator may be used to invalidate the badge after a predetermined period of time such as an hour, a day, a week, a month, or the like.

A principle object of the identification badge of the present invention is to provide an identification badge that is economical to make, simple in construction, easy to assemble without requiring any special equipment and easy to attach to clothing without damage thereto.

Another object of the present invention is to provide an identification badge wherein the possibility of duplication, tampering with, or counterfeiting is minimized.

A further object of the present invention is to provide a means by which a multiplicity of various fasteners may be quickly attached to, or removed from, the badge without damaging the badge or the fastening means.

A still further object of the present invention is to provide an identification badge that may be replaced without replacing the fastening means.

Still another object of the present invention is to provide an identification badge which can be assembled at the location of use such as at a convention center, a trade show or a meeting room.

Yet another object of the present invention is to provide an identification badge which can be cut to size at the site of use so that identification indicia such as business cards can be used as identification media.

A further object of the present invention is to provide an identification badge having a timing indicator which provides a clear indication of when the badge has expired or become invalid.

Still another object of the present invention is to provide a self-expiring identification badge.

Yet another object of the present invention is to provide an identification badge having a timing indicator which can be selected for the appropriate interval of time the badge will be used.

Other objects and advantages will be apparent from the following detailed description of the invention taken in conjunction with the accompanying claims.

BRIEF DESCRIPTION OF THE DRAWINGS

The invention is illustrated in the accompanying drawings wherein.

DETAILED DESCRIPTION

The identification badge of the present invention, as shown in FIGS. 1–7 and indicated generally in various embodiments as 10, 40, 70, 110, 210 or 240 comprises a transparent or opaque base with an adhesive layer protected by release paper. An upper margin area of the base typically includes a slot which accepts various types of fastening means.

A timing indicator which validates the badge for a preselected time interval can be adhered to the adhesive layer of the badge. This adhesive layer activates the migrating inks of the timing indicator to visually indicate after the passage of the preselected time interval that the badge is no longer valid.

The base is typically rectangular and comprised of a plastic or similar stiff material to which adhesive such as a natural latex or a fugitive adhesive is applied to either its front or the back surface. Preferably, the upper margin area of the base has no adhesive applied to it but has a slot formed in it for accepting various fastening means. A release paper is applied over the adhesive coated area of the base to protect the adhesive layer until the badge is to be assembled. To assemble the badge, the release paper is removed from the adhesive layer and an identification card, or the like, is then adhered to the adhesive layer. A fastening means is attached to the slot in the base and the assembled badge may then be attached to the user's garments.

In an alternative embodiment, a transparent base or semi-transparent base material is used. On the rear surface of this base, an adhesive layer is applied and release paper is applied over this adhesive layer to protect it until the badge is to be assembled. In this embodiment, the release paper is removed from the adhesive layer and the front of the identification card, or the like, is pressed against the adhesive layer so that the identification information is viewed through the transparent base of the badge. In this embodiment, the adhesive selected is normally a permanent type adhesive. Any attempt to remove the identification card would damage the card or the information printed on the card and thus indicate an attempt to tamper with the badge.

Figure 1:
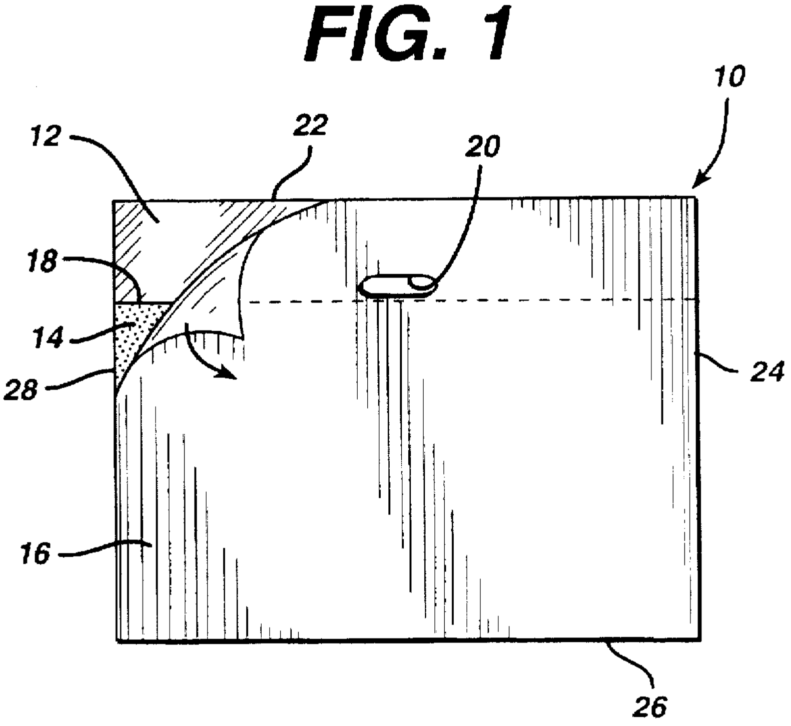
FIG. 1 is a frontal view of the identification badge of the present invention showing a release sheet that covers the front surface of the badge which may be peeled away therefrom.

Shown in FIG. 1 is badge 10 to which an identification card (not shown) is to be applied to a portion of the front surface thereof. Badge 10 comprises base 12, an adhesive layer 14 applied to a portion of its front surface, a peelable strip of release paper 16 that covers the adhesive layer of the front surface of base 12, an upper margin area 18 which has no adhesive applied to it, and slot 20 punched in the upper margin for accepting various fastening means. Base 10 comprises a front surface, a rear surface, a peripheral edge comprised of an upper edge 22, a right edge 24, a lower edge 26, and a left edge 28.

Base 10 can be sized or shaped into any form that is appropriate for the identification card that is to be adhered to it. Typically, rectangular type identification cards are used. However circular, trapezoidal, polygonal or various other shapes could be used to create easily recognized and quickly identifiable badges. In addition, base 10 can be formed of transparent or opaque materials, or the base could be tinted or colored to create further visual recognition of the type of badge or accessibility level of the wearer of the badge to particular locations.

Figure 2:
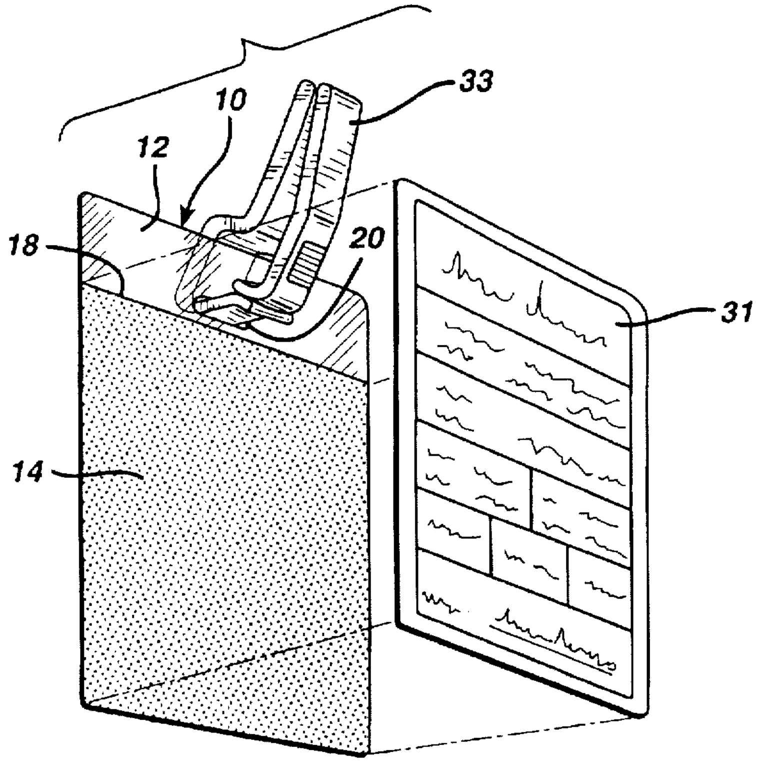
FIG. 2 is a perspective view of the badge of the present invention showing how an identification card would be aligned on the badge.

A fastening means 33, shown in FIG. 2, may be attached to the badge via slot 20 formed in base 10. These fastening means enable the user to attach the badge to their clothing. Various types of fastening means may be used such as clip 33 shown in FIG. 2 or any of a multitude of other fasteners. Typically, the fastening means will be such that the badge will automatically swing into a vertical position with the card upright, irrespective of how the fastener is attached to an individual's garment.

Slot 20 is, typically, an elongated aperture formed or punched into the upper margin area 18 of base 12 of the badge. In an alternative embodiment (not shown), badge 10 may also have a plurality of holes punched in the upper margin 18, the holes accepting a fastening pin, or the like, which then attaches the badge 10 to an individual's garment.

Base 10 is typically made from a stiff plastic polymer although other relatively rigid materials can be used for the front mounted embodiment shown in FIGS. 1 through 5. In these embodiments, the adhesive used is typically a fugitive glue so that the identification card can be easily removed if the base is to be reused.

Identification information may be applied to an identification card 31, shown in FIG. 2. This identification information is typically sized to be visibly readable at a substantial distance. Identification card 31 may comprise both pre-printed information such as company identification, logos, special colors or designations to indicate special status, and/or identification information as printed by computer printers or similar devices and/or hand printed or hand written information. After the peelable strip 16 of release paper is removed from the adhesive layer 14 of FIG. 2, the rear of the identification card 31 is aligned and pressed against the adhesive layer 14. The upper edge of identification card 31 is typically aligned with the lower edge of the upper margin area 18 which corresponds to the top edge of the adhesive 14. Once the identification card 31 is adhered to the base 12 by pressing it onto the adhesive 14, the base 12 can be trimmed to the same size as the identification card 31, if desired.

A badge 10 with an identification card 31 might typically be assembled by a receptionist or a security person and used to identify a visitor to a facility. These applications can use a pre-printed identification card 31 that allows for manual insertion. The information on card 31 may be computer printed for a visitor, and may include location access information, security level information, expiration date or dates, etc.

Slot 20 of FIG. 1 is typically placed midway between the right edge 24 and left edge 28 of the base 12 and near the lower portion of the margin area 18. The slot 20 formed in the margin area 18 is preferably round or elliptical, is centrally located between the side edges, and is located toward the bottom of the margin area 18. Slot 20 should be sufficiently close to the upper edge 22, FIG. 1, of the base 12 so that the fastening means can be slipped through the slot 20 without undue interference. However, in order to ensure adequate strength in the portion of the margin area 18 between the upper edge 22 and the slot 20, the slot 20 should be placed in the lower section of the margin area, if feasible.

Figure 3:
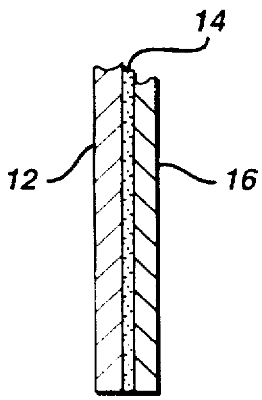
FIG. 3 is a side elevational view, in cross section, of the layers comprising the badge of the present invention.

In FIG. 3 there is shown a side elevational view in cross section of badge 10 having three layers: base 12, adhesive layer 14, and the peelable strip 16 of release paper. The embodiment of badge 10 shown in FIG. 3 includes an identification card that is adhered to the front surface of the base 12.

Figure 4:
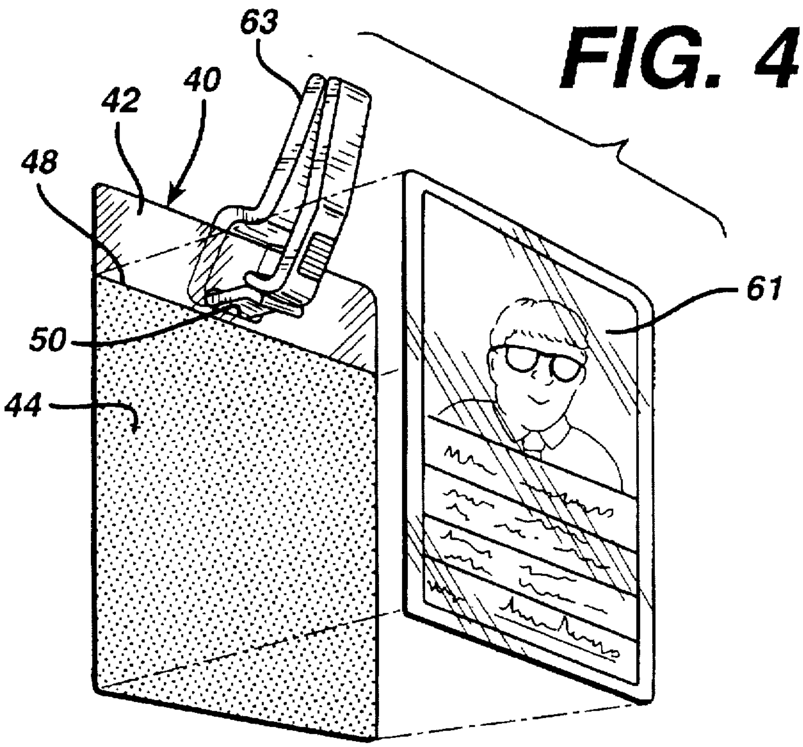
FIG. 4 depicts the badge of the present invention wherein a photographic identification badge is applied to the base of the badge.

FIG. 4 illustrates a photographic identification card 61 applied to adhesive layer 44 of photo identification badge 40. Badge 40 comprises a base 42 including an upper margin area 48 and an area below the margin area to which adhesive 44 is applied. The area to which the adhesive 44 is applied on the supporting base 42 is sized to accept the photo identification card 61 when the back of this card is aligned and pressed against adhesive 44. A fastener 63 is inserted through slot 50 and then attached to the user's garment so that the badge 40 can be readily displayed.

Figure 5:
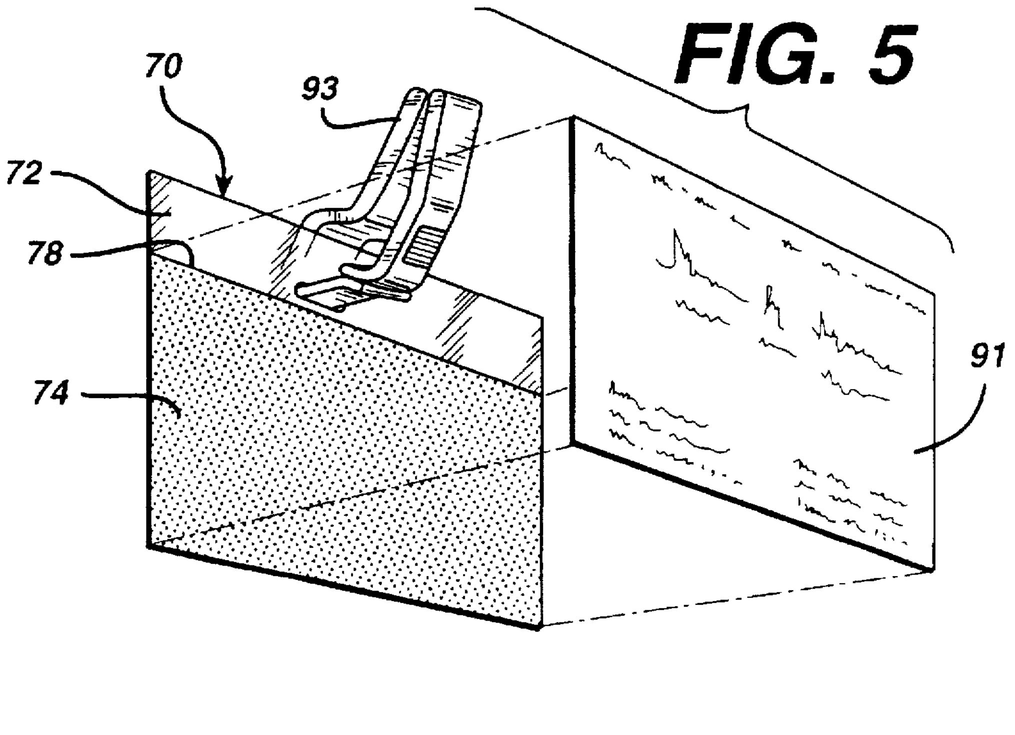
FIG. 5 depicts the badge of the present invention wherein a rectangular business card is adhered to the badge.

FIG. 5 illustrates a business card badge 70 comprising a base 72, an upper margin area 78, a slot 80 formed in margin area 78, and an area below margin area 78 to which adhesive 74 is applied to coat the front surface of base 72. The adhesive coated section 74 of base 72 is sized so that a business card 91 can be aligned and adhered directly to the adhesive 74 and immediately form an identification badge.

Figure 6:
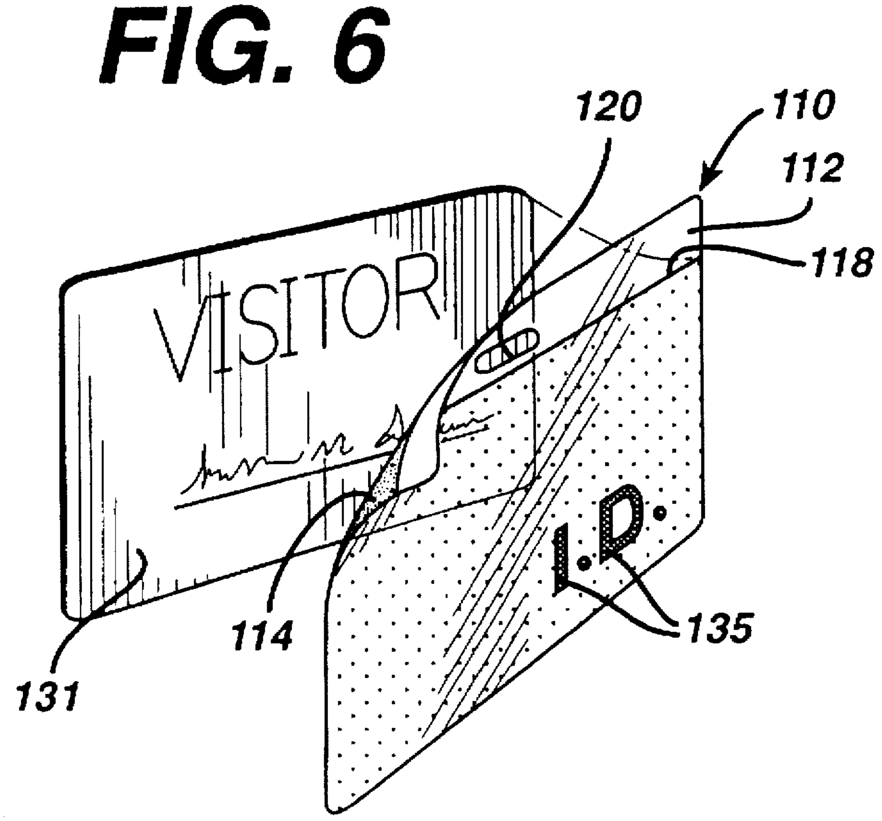
FIG. 6 depicts an embodiment of the badge of the present invention wherein the badge is transparent and the identification card is applied to the back thereof and is viewed therethrough.

FIG. 6 illustrates a see through embodiment of the badge 110. In this embodiment, badge 110 comprises a transparent or semi-opaque base 112, an adhesive 114 applied to the rear surface of the base 112, an upper margin area 118 located above the area coated with adhesive, slot 120, and a peel off layer of release paper 116, FIG. 7. Base 112 typically comprises a transparent or semi-transparent plastic material. Organizational identification indicia 135 may be pre-printed or applied to this base 112. Base 112 is typically formed in a rectangular shape but may be formed in any shape that is appropriate for an identification card to be adhered to it. Base 112 may be formed in circular, trapezoidal, polygonal or various other shapes to create easily recognized and quickly identifiable badges. Centrally located in the upper margin area 118 and toward the bottom edge of this margin area is a slot 120. Slot 120 provides a means for attaching various fastening means to base 112 so that the assembled badge 110 can be attached to the user's garments.

Figure 7:
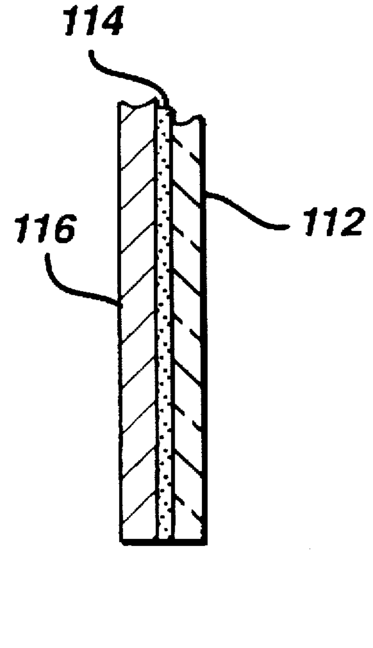
FIG. 7 shows a cross-sectional view of the badge of FIG. 6.

In use the peel off layer 116 release paper of FIG. 7 is removed from the rear surface of base 112 to expose adhesive 114. The front surface of an identification card 131 (FIG. 6), is aligned and applied against the adhesive 114. The adhesive 114 is typically of a permanent type such that once the identification card 131 is adhered to the adhesive 114, any attempt to remove the identification card 131 will cause the card to be damaged and thus indicate tampering.

FIG. 7 is a side elevational view in cross-section of the see-through badge 110 of FIG. 6. This side view shows base 112, the layer of adhesive 114 adhered to the rear surface of base 112 and a peel off layer of release paper 116 applied over adhesive 114. The peel off layer of release paper 116 protects the adhesive until the badge is ready to be assembled.

When used as a visitor's pass, the badge 110 of FIG. 6 is typically assembled by a receptionist or a security person. The identification card 131 typically contains pre-printed organizational information and space in which either hand printed, computer printed, or the like, identification information is inserted. Typically, an expiration date is indicated on identification card 131. After this information is entered, the front surface of the identification card 131 is pressed onto the adhesive 114 on the back of base 112. Adhesive 114 is typically a permanent adhesive which adheres to the front of the identification card 131. The identification card 131 cannot thereafter be removed without being damaged.

Base 112 of the badge provides mechanical support and rigidity to support the identification card applied to the adhesive 114. The adhesive 114 is typically a thin layer of transparent adhesive.

The information printed on the front surface of the identification card 131 is visible through the transparent base 112 and the transparent adhesive 114. This information identifies the wearer of the badge.

An additional series of embodiments to the see-through badge incorporates a timing indicator or timing spot to automatically void the badge after a specified elapsed time. Such timing indicators are shown in U.S. Pat. Nos. 4,903,254 to Haas and 5,058,088 to Haas et al. The entire disclosures of which are incorporated here in by reference.

Figure 8:
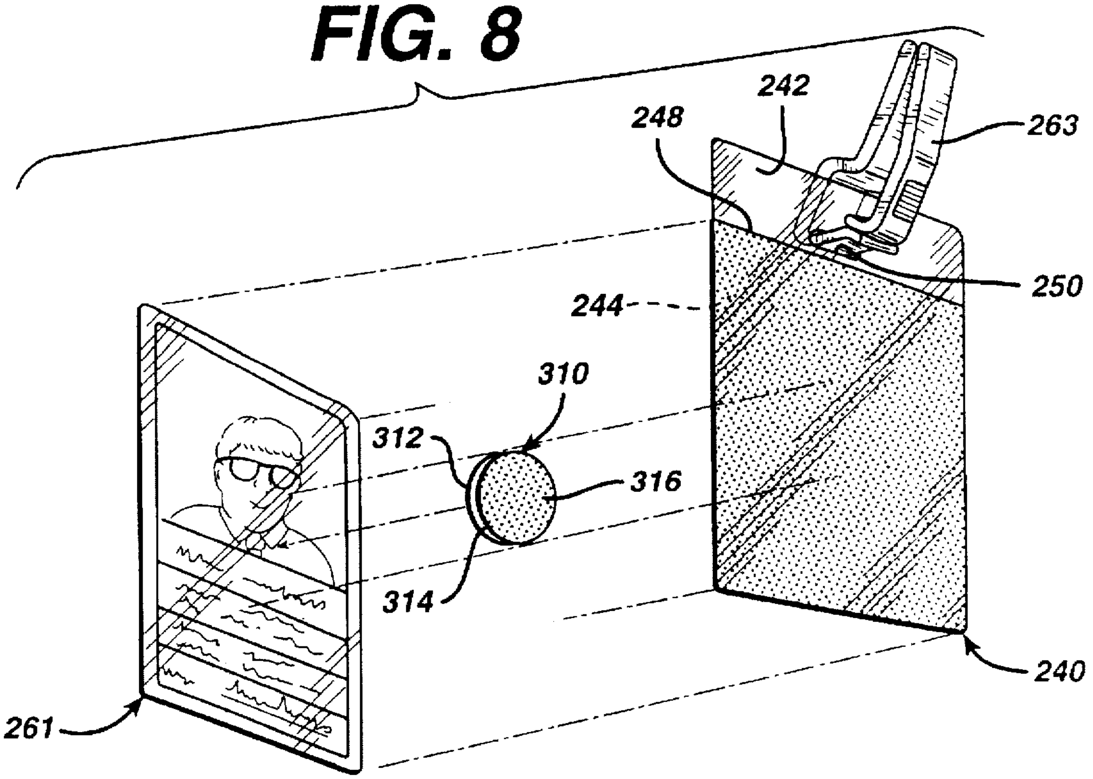
FIG. 8 shows the badge of the present invention wherein a timing indicator is included.

The timing spot, 310 of FIG. 8, comprises a transparent substrate 314, the rear surface being coated with an adhesive, 312, and the front surface having an ink pattern, 316, printed or deposited thereon. This ink pattern typically comprises a dot pattern formed of soluble ink and insoluble ink, although the timing spot could be printed entirely of a soluble ink which would grow dark over time. When the ink pattern 316 is placed in contact with the adhesive 244 on the rear surface of the photo identification badge 240, an activator chemical contained in this adhesive, reacts with the soluble ink. This reaction is time dependent. By appropriate selection of the activator chemicals, concentrations, and the inks, time periods ranging from hours to days to weeks to months can be selected. As the activator chemical reacts with the soluble ink, the ink migrates across the face of the substrate 314 until the dot pattern bleeds and blends together to indicate that the period of time for which the badge was issued has expired. The migrating ink is typically colored red, or the like, so that upon expiration, it can clearly be seen that the badge is expired. Various indicia patterns can be incorporated into the timing spot 310 by printing the soluble ink and the insoluble ink in the appropriate patterns. For example, the characters of the word VOID, 416 of FIG. 9, could be printed in a insoluble ink. The soluble ink 418 dot pattern would then printed in the area surrounding these characters. After activation, the soluble ink 418 would migrate and bleed and blend together to cause the term VOID in the indicia are to be outlined in a color such as red, or the like.

Figure 10:
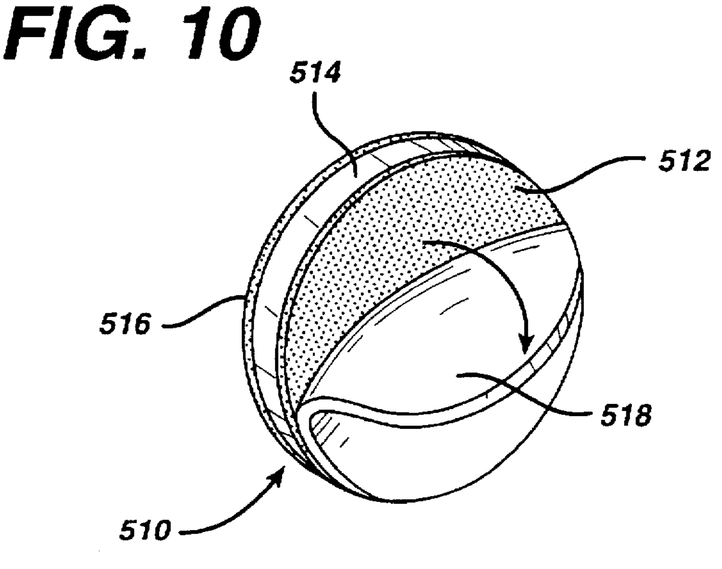
FIG. 10 is a perspective view of the timing indicator used in the badge shown in FIG. 9.

To assemble a photographic identification badge 240 with a timing indicator, 310 of FIG. 8, the following method would be typical. A peel-off protective layer, 518 of FIG. 10, would be removed from the timing spot, 510 of FIG. 10 or 310 of FIG. 8, to expose the adhesive 512 of FIG. 10 or 312 of FIG. 8 on the back of the timing spot substrate 514 of FIG. 10 or 314 of FIG. 8. This adhesive would then be brought into contact within an appropriate area of the photographic identification card, 261 of FIG. 8 and adhered to this card. A peel-off protective layer is then removed from the adhesive 244 of base 242. Base 242 is then aligned to the photo identification card 261 and the photo identification card 261 is adhered to the adhesive 244. A fastener 263 is then attached to slot 250 to complete the assembly of the photo identification badge 240.

Adhesive 244 contains a chemical activator which when brought into contact with the soluble ink 316 on the front surface of timing spot 310 starts to dissolve the soluble ink and causes this ink to migrate across the front surface of the timing spot 310. As time progresses, the area covered by the migrating ink increases until at the end of the selected time period, the migrating ink spots bleed and blend together to provide a visible indication that the badge is expired.

Figure 11:
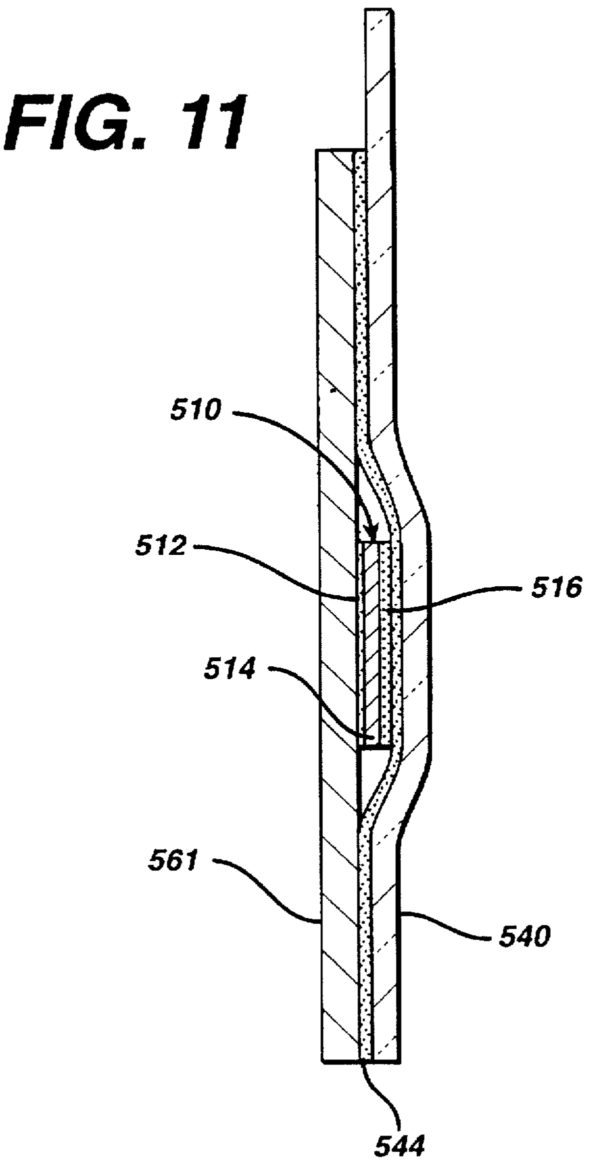
FIG. 11 is a cross-sectional view of the badge shown in FIG. 8.

FIG. 11 is a side elevational view in cross-section of an assembled badge of FIG. 8 with a timing indicator inserted between the identification card 561 and transparent base 540 of the badge. In this combination, adhesive 512 of the timing spot adheres the transparent substrate 514 of the timing spot to the front surface of the identification card 561. The adhesive 544 on the back surface of the transparent base 540 adheres the base 540 to the front surface of the identification card 561 and simultaneously is brought into contact with the ink layer 516 deposited on the front surface of the timing spot substrate 514. The adhesive layer 544 contacts the soluble ink in the ink layer 516, to dissolve the ink and causes it to migrate over the front surface of substrate 514.

Figure 9:
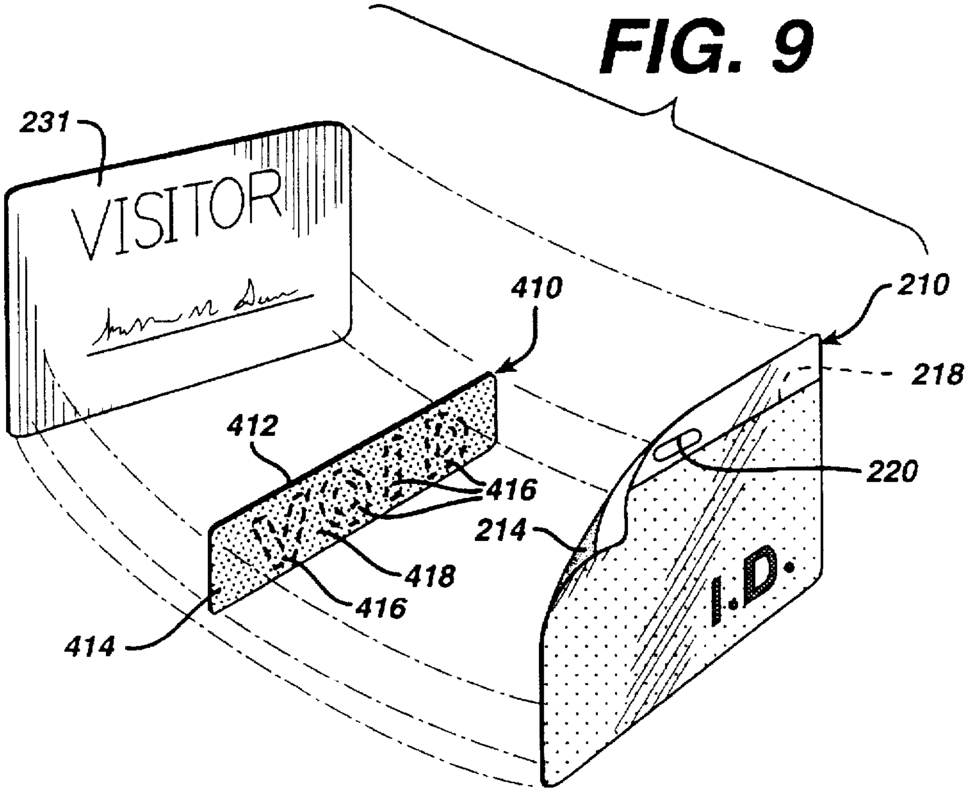
FIG. 9 shows the badge of the present invention wherein another timing indicator is included.

Another embodiment of the see-through badge incorporating a time indicator is shown in FIG. 9. In this embodiment, the ink pattern which is comprised of an array of ink dots contains latent information, for example, the characters that form the word "VOID". This latent information is incorporated into the timing indicator 410 by printing or depositing the dot patterns with soluble and insoluble inks. For example, for the word VOID to appear, the dot pattern could be deposited such that all the dots within the characters of this word are of a soluble ink and thus will migrate and bleed and blend together once dissolved. The dots forming the background area would be printed with insoluble ink.

Alternatively, the ink deposited as the background, or mask, for the indicia, VOID, could comprise dots of soluble ink. The dot pattern forming the characters of the word VOID would be comprised of insoluble ink. Thus, when the ink dots 418 surrounding the characters of the word VOID, 416, are brought into contact with the adhesive 214 deposited on the rear surface of the transparent base 212, after preselected time period, the ink dots comprising the background area surrounding the word VOID will bleed and blend together to cause the word VOID to appear.

The badge of FIG. 9, would be assembled in the same manner as described for the badge of FIG. 8. That is, a peel-off protective layer would be removed from adhesive 412 on the back surface of the transparent substrate 414 of the timing indicator 410. This adhesive surface of the timing indicator would be placed in contact with an appropriate area on the front surface of the identification card 231 thus adhering the timing indicator to said card. A peel-off protective layer would then be removed from the adhesive 214 on the rear surface of the transparent base 212. This transparent base 212 would then be aligned to the identification card 231 and the adhesive 214 would adhere both the front surface of the identification card 231 and the timing indicator 410 to form a composite see-through badge 210. A fastener may then be attached to slot 220 and to a wearer's clothing.

When the adhesive 214 is brought into contact with the soluble ink 418 dots deposited on the front surface of the substrate 414, the adhesive 214, starts to dissolve the soluble ink. These ink dots dissolve and the ink migrates so that the dots blend together to provide an indicator of the expiration of the badge.

Various character or symbolic indicia may be incorporated into this pattern by depositing a combination of soluble and insoluble inks on the substrate of the timing indicator. The time to develop each indicia area is preselected by varying the geometric shape and size of the dots and/or varying the dot-to-dot linear distance. Depending on the application and time interval required, the same geometric shape and size of each dot can be maintained while varying the dot-to-dot linear distance, or the dot-to-dot linear distance can be held constant while varying the geometric size and shape of the dots and/or changing both of these variables.

Additionally, dot patterns incorporating different densities of soluble ink can be deposited on the front surface of a timing indicator to vary the perceptible bleeding and blending together of the soluble ink.

The rate at which the adhesive dissolves the soluble inks is temperature dependent. For identification badges such as will be used at normal room temperatures (70° to 80° F.), time periods from less than a day to a day, several days, a week, several weeks, a month and longer can be readily selected as previously described. Exposing the timing indicator to higher or lower temperatures can affect the time required for the ink dots to be dissolved, migrate and coalesce.

The rate of ink migration or "dot growth", can be accurately controlled by selection of the adhesive, the dyes or inks used, and the dot density used. The most effective visual indication of an elapsed time period is achieved when both the soluble and insoluble dots are printed in the same color, typically black or red ink. The identification card 231 of FIG. 9 can be clearly seen through the dot pattern of the timing indicator 410 and the transparent substrate 414. Prior to activation, any information or pattern contained in the soluble dot pattern tends to be hidden until the adhesive 214 contacts the ink and causes the soluble ink dots to dissolve and migrate. The migrating ink bleeds over the front surface of the substrate 414 causing each dissolving dot to appear to grow. As each dot grows across the front surface, and especially where the dot pattern is selected so that the dots bleed into each other, the area covered becomes visibly darker.

The soluble and migrating ink dots may be printed or deposited on the front surface of the timing indicator substrate 414 of FIG. 9 to outline or stencil information such as the word VOID 416, bars, or other geometric or symbolic indicia.

Temperature affects the rate at which the dissolves the soluble ink dots and thus the rate of migration or bleeding of the ink contained in each dot. The affect of temperature variations on a timing indicator can be compensated for by varying the geometric dot pattern and by varying the ink density of the dots. One method of temperature compensation is to use a progressive display pattern. As time progresses, only the display pattern corresponding to a limited temperature range will show a visually perceptible change. Thus, timing indicators can be prepared which compensate for exposure of the badge to various temperatures while maintaining a relatively good indication of the elapsed time.

The time interval between activation of the badge and expiration of the badge may be varied by printing dot patterns of a greater or lesser density and by a greater or lesser linear distance between dots. For example, a very fine dot pattern (low ink volume per dot) comprising 100 to 140 dots per inch rapidly migrates upon activation and darkens quickly. However, this very fine pattern does not become as dark as a coarse pattern of dots (high ink volume per dot) deposited at 40 to 80 dots per inch. Indicia are often incorporated into the timing indicator. To give the appearance of invisibility of this indicia, all dots on the timing indicator are deposited or printed of a uniform tint, typically on the order of 10 percent. However, these dots may be thick (coarse), so as to contain a substantial volume of ink. As this large volume of ink dissolves and migrates, it becomes very dark and/or migrates over a large area when activated.

In the embodiments of an identification badge incorporating a timing indicator, almost any adhesive may be used which is receptive to dyes or inks. A receptive adhesive is an adhesive that is capable of dissolving an ink and causing an ink to migrate away from its point of application or deposit. By adding polar and/or non-polar materials to the adhesive, the absorption properties of the adhesive can be altered.

Preferred adhesives to be applied to the back surface of the base of the transparent badge may be obtained commercially from Avery Company, Fasson Films Division, Painesville, Ohio. Visually perceptible changes can be caused by increasing the dot density, or by a color variation, or both. Typically, a change in color is achieved by printing the dots with a number of component inks. However, only one component would be soluble and only this component would migrate. Thus, a visible color change corresponding to the color of the soluble ink component of the dot may be achieved.

Furthermore, solid ink patterns may be incorporated. In such embodiments, the solid ink pattern is typically comprised of at least two components of different colors, one of which can be bled out to produce a color change. In another embodiment, a mask can be used on the adhesive such that the color change only takes place in discrete areas where the adhesive contact the ink. Thus, the solid ink pattern can hide latent information. Such a mask may also be used on the adhesive in connection with a pattern of dots. In such an embodiment, the dots may all be printed of a soluble ink, and the adhesive would have a mask applied to it to allow the adhesive to contact a portion of the dots to cause the dots to dissolve and bleed and blend together.

Preferred inks for use with this invention may be obtained commercially from Gans Ink Company, Los Angeles, Calif. In particular Pyroscript Sublimination Inks, e.g.; Ink Nos. 57977, 57976, Heat Transfer Inks, Turn-A-Bout, Sunrise Process, Sunburst Process and Turn-A-Bout R.S. Series Inks. Other manufacturers include Superior Ink Company in New York and Proflexo. Sublimation and heat transfer type inks are generally low molecular weight dyes that can bleed. Standard inks which do not bleed include particles, i.g., finely ground non-migrating solids (vis-a-vis molecules) which provide deep colors.

The adhesive may be a standard adhesive such as adhesive No. 287 manufactured by H & N Chemical Adhesives Company. The stimulus effect of the adhesive can be increased or decreased by modifying the adhesive. Adding a plasticizer to the adhesive increases the rate at which the ink dissolves and thus the rate of migration. Typically, a plasticizer is added when the timing indicator is used in cold environments while the unmodified standard adhesive is suitable for environments over 60 degrees F.

A still further embodiment of the timing indicators described in FIGS. 8 through 11, are the use of timing indicators that do not themselves have an adhesive layer. In these embodiments, the timing indicator is placed directly over the identification card and then the transparent base of the see-through badge is adhered to the front surface of both the identification card and the timing indicator. Alternatively, the timing indicator may be placed directly in contact with the adhesive on the transparent base of the badge and then the identification card adhered to this base. Thus, the adhesive of the transparent base of the badge both activates the soluble ink of the timing indicator and retains the timing indicator in its appropriate location.

It will be appreciated by those skilled in the art that only a few embodiments have been illustrated and described. However, variations may be made in the particular design and configuration of the inventive badge without departing from the spirit and scope of the invention as set forth in the appended claims.

What I claim is:

1. A time dependant identification badge comprising:

an identification card having a first surface with identification indicia thereon;

a time indicator comprising a substrate having first and second surfaces, an ink pattern of dots printed in a preselected pattern on the first surface and an adhesive on the second surface, the second surface of the time indicator in adhesive contact with the first surface of the identification card and covering only a portion of the first surface;

a transparent base having an adhesive activator applied to one surface thereof, the one surface of the transparent base overlying and in adhesive contact with the first surface of the time indicator and the first surface of the identification card, the identification indicia visible through the base;

wherein when the one surface of the transparent base having the adhesive activator is contacted with the first surface of the time indicator having an ink pattern of dots printed in a preselected pattern thereon, the ink and adhesive activator coact to cause the ink pattern of dots to gradually bleed and blend together along the surface of the first surface of the time indicator to cause a change visually perceptible through the transparent base in a selected time interval.

2. The identification badge of claim 1, wherein the one surface of the transparent base is covered by a removable release sheet before the identification card is adhered thereto.

3. The identification badge of claim 1, wherein a fastening means for attaching the identification badge to a user's clothing is mounted on a portion of the transparent base.

4. The identification card of claim 1, wherein the visually perceptible change comprises the appearance of the word "VOID".

5. The identification card of claim 1, wherein the time indicator is circular.

* * * * *